June 24, 1958  J. F. MANILDI  2,839,922
AIRSTREAM DIRECTION INDICATOR
Filed Aug. 10, 1955  2 Sheets-Sheet 1

JOSEPH F. MANILDI,
INVENTOR.

BY Barbelew & Scantlebury
ATTORNEYS.

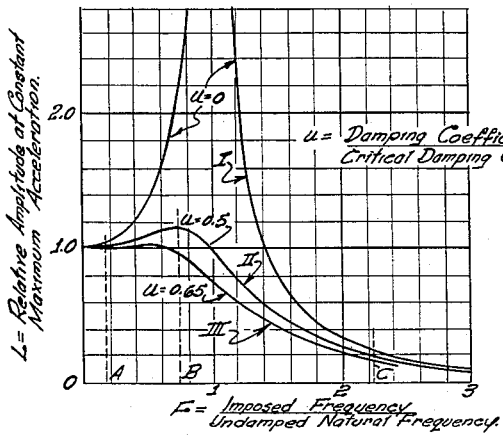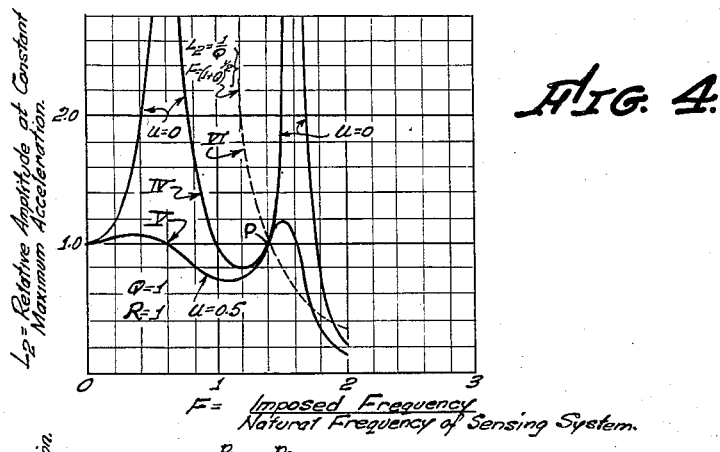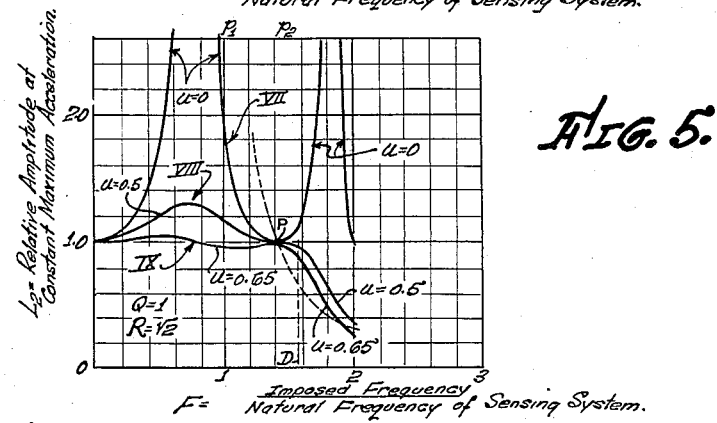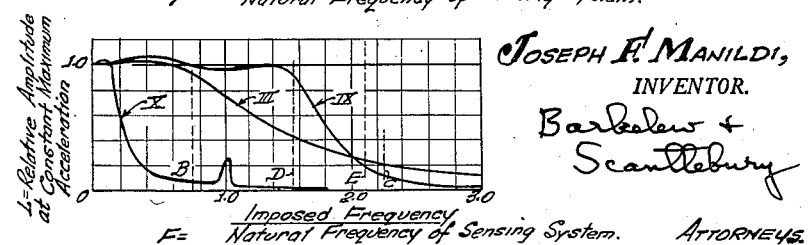

United States Patent Office 2,839,922
Patented June 24, 1958

2,839,922

AIRSTREAM DIRECTION INDICATOR

Joseph F. Manildi, Sherman Oaks, Calif., assignor to G. M. Giannini & Co., Inc., Pasadena, Calif., a corporation of New York Application August 10, 1955, Serial No. 527,497

4 Claims. (Cl. 73—188)

This invention is concerned with instruments which are responsive to variations of a physical quantity, and which present information about such variations in any useful form. The information may, for example, be displayed visually as by a pointer and scale, may be recorded, may be supplied to computing or control mechanisms of many different types, and the like. Presentation of data for useful operations of any such type will be referred to for convenience as indication.

It is sometimes desirable that such instruments be responsive to certain types of variations of the physical quantity in question, and substantially non-responsive to other types of variations. In particular, it may be desired to indicate variations corresponding to frequency components lower than some critical frequency and to substantially exclude frequency components higher than that critical or cut-off frequency.

The present invention relates more particularly to improved mechanism by which the cut-off frequency of such instruments and the response characteristic in the vicinity of the cut-off frequency may be controlled.

The invention relates particularly, although not necessarily exclusively, to instruments of the type described in which a physical element is caused to move in response to the quantity to be indicated. That movable input element may typically have a normal position, which may correspond, for example, to some normal value, such as zero, of the quantity to be indicated; and may be displaced from that normal position in response to departures of the physical quantity from its normal value. In instruments of that type the movable element and its driving mechanism, which will be referred to for convenience as the "sensing system," may ordinarily be considered as a dynamical system having a more or less well defined natural frequency of vibration. The natural frequency may be substantially constant, or may vary over a considerable range, for example in accordance with variations of the physical quantity to be presented, or of other factors.

A more particular object of the present invention is to provide in instruments of the type described a response function having an effective cut-off at a frequency appreciably lower than the natural frequency of the sensing system.

A further object of the invention is to provide such an instrument having a cut-off frequency that is substantially independent of variations in the natural frequency of the sensing system.

In accordance with another aspect of the invention the frequency response of the instrument may be made substantially uniform from zero frequency to a critical frequency appreciably higher than the natural frequency of the sensing system.

In accordance with another aspect of the invention, a particularly sharp cut-off characteristic at the critical frequency may be provided. That is especially important when the variations of the physical quantity in question increase with increasing frequency above the critical value.

The invention further provides mechanism by which a required type of frequency response may be provided in certain types of instruments with simpler and more economical damping means than are required in conventional instrument of comparable design.

A full understanding of the invention and of its further objects and advantages will be had from the following description of certain illustrative manners in which it may be carried out. That description, of which the accompanying drawings form a part, is intended for illustration, and not as a limitation upon the scope of the invention, which is defined in the appended claims.

In the drawings:

Fig. 2 is a graph illustrating typical behavior for the instrument of Fig. 1;

Fig. 4 is a graph illustrating typical behavior for an instrument in accordance with Fig. 3 for certain illustrative values of parameters;

Fig. 5 is a graph similar to Fig. 4, for further illustrative values of parameters;

Fig. 6 is a graph reproducing selected curves from Figs. 2 and 5;

Figure 1:
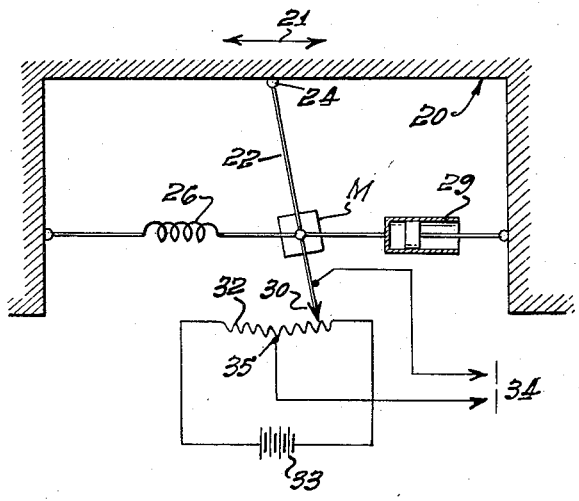
Fig. 1 is a schematic drawing of a conventional type of accelerometer.

Fig. 1 represents in schematic form a conventional type of instrument for measuring horizontal accelerations, which is illustrative of the instruments to which the present invention pertains. The conventional accelerometer of Fig. 1 comprises a mass M mounted with respect to a rigid frame or case, indicated at 20, for movement in a horizontal direction. As shown, mass M is mounted on a lever 22, which is pivoted at 24 on a horizontal pivot axis fixed to the frame. Resilient restoring means are provided, tending to maintain mass M at a definite normal position, that position being such that lever 22 is vertical. Such means are represented as a spring 26, acting between mass M and the case. The effect of gravity upon the mass may be neglected, or may be taken into account as a correction to the effective rate of spring 26. That spring rate K may be expressed in units of torque per radian deflection of mass M from normal position.

If frame 20 is accelerated bodily in a horizontal direction in the plane of Fig. 1, as indicated by the arrow 21, mass M tends to swing about pivot axis 24 away from its normal position and against the restoring force of spring 26. The movement path of M is substantially a straight horizontal line for sufficiently small departures of lever 22 from its normal vertical position. For purposes of illustration, the suspension shown may thus be considered to represent a horizontal guideway, for example. Modifications of the following discussion appropriate to rectilinear instead of rotary movement of mass M and of the further structures to be described will be evident without detailed explanation.

In practice, damping means are also provided in any suitable manner, to oppose movement of mass M relative to the frame. Viscous damping means are illustratively indicated at 29, the degree of damping being controllable, for example, by selection of the clearance between the indicated cylinder and piston.

Movement of mass M relative to the case provides a measure of the acceleration of the case, which may, for example, be mounted rigidly in a vehicle whose acceleration behavior is under investigation. The information may be indicated in many different ways, for example by an electrical signal developed by a potentiometer. As shown, a potentiometer brush 30 is carried by lever 22 and engages a potentiometer winding 32 which is connected across a source of direct current potential represented by the battery 33. Output terminals 34 are connected typically to brush 30 and to the midpoint 35 of winding 32, respectively, so that the output signal is zero for normal position of mass M, corresponding to zero acceleration.

The behavior of such a system in response to any arbitrary impressed acceleration may be considered in terms of its response to individual harmonic frequency components into which that acceleration may be resolved. An impressed acceleration of constant magnitude A produces some definite angular deflection $\theta$ of mass M, the value of $\theta$ being typically substantially proportional to A, and the constant of proportionality typically depending upon the rate constant of spring 26, the mass of M, and various geometrical factors. If the case 20 is subjected, for example, to a sinusoidal oscillation at an impressed frequency $f$ and of such amplitude that the maximum acceleration is $a_m$, the impressed acceleration A may be expressed as $$A = a_m \cos 2\pi ft \quad (1)$$

The position of mass M then typically oscillates sinusoidally about its normal position with the same frequency $f$, but with an amplitude $\theta_m$ that is different from the angular deflection $\theta_s$ that would result from a steady acceleration equal to $a_m$. When damping is present, the deflection of M is typically not in phase with the impressed acceleration, but the present discussion is concerned primarily with the amplitude response, and the phase relations need not be discussed. A useful measure of the amplitude response is provided by the relative amplitude characteristic $L = \theta_m/\theta_s$, which will be referred to as the response function. An ideal mechanism for many purposes would provide $L=1$ for all impressed frequencies $f$ from zero to some critical cut-off value $f_c$; and $L=0$ for all higher frequencies.

It is convenient to express the frequency $f$ in terms of the ratio $F = f/f_n$, where $f_n$ is the natural frequency of vibration of the sensing system. That natural frequency $f_n$ is typically equal to $$\frac{1}{2\pi}(K/I)^{1/2}$$

where K is the torque constant of spring 26 and I is the moment of inertia of mass M and its associated mechanism about pivot axis 24.

Fig. 2 is a graph showing typical response behavior for a conventional system of the type shown in Fig. 1, in terms of the variation of the response function L of the system plotted as a function of the relative frequency F of the impressed acceleration. Response curves are given for three different degrees of damping, expressed as the fraction $u$ of critical damping. The useful operating range of the instrument, within which it presents a relatively undistorted picture of the impressed acceleration, is limited to the range of impressed frequencies for which L is approximately unity. Whereas the permissible values of L may vary greatly with circumstances, the useful frequency range of the instrument will be taken for purposes of illustration as that for which L is within 5% of unity.

From curve I of Fig. 2 it is evident that for zero damping L meets that requirement only in the narrow frequency range from 0 to A. With suitable values of damping the range may be greatly extended. For $u=0.65$, for example, curve III shows that L is substantially equal to unity for frequencies from 0 to a value indicated at B, approximately equal to 70% of the natural frequency $f_n$. However, for a single system of the type described, it is not possible to extend the useful response to frequencies significantly higher than $f_n$.

Fig. 2 also illustrates limitations of the conventional single system with respect to the sharpness and completeness of cut-off at frequencies above the useful range. If, for purposes of illustration, a significant indication is taken as one for which $L=0.2$ or more, it is evident from curve III that for a damping constant $u=0.65$ a significant output will result from acceleration components in the frequency range B to C. Accelerations in that frequency range will show up significantly, but distorted relative to acceleration components in the useful range. Only at frequencies higher than C does the filtering action of the instrument meet the illustrative requirement of preventing any significant output. The extent of frequency range B–C, particularly when considered with relation to the useful range 0–B, may be considered a measure of the sharpness of cut-off. Curve III obviously leaves much to be desired in that respect.

At impressed frequencies above C the response function L decays asymptotically to zero. However, in interpreting this characteristic it must be kept in mind that Fig. 2 is based upon the assumption that the maximum acceleration $a_m$ remains constant as the frequency is varied (see Equation 1, above). In many applications the high frequency vibrations which it is desired to exclude from the output may be characterized more nearly as having constant maximum displacement from neutral position, rather than constant maximum acceleration. Since, for constant maximum displacement, the maximum acceleration varies directly as the square of the frequency, the accelerations impressed upon the system may actually be many times higher in the unwanted high frequency region than in the operating range. To provide satisfactory filtering under such conditions, the response function L must not only decrease with frequency; it must decrease more rapidly than the impressed accelerations increase.

Whereas corresponding considerations apply in many other types of instruments also, their significance in accelerometers is immediately clear on physical principles and without resort to mathematics. Referring to Fig. 1, if the instrument frame 20 is subjected to horizontal vibrations of very high frequency, it will be recognized at once that the mass M will remain essentially stationary with respect to the inertial frame of reference, typically the earth's surface. Hence, the output, derived from displacement of the mass relative to the frame, then corresponds to displacement of the frame rather than to its acceleration. The system becomes a seismic system, and the instrument acts as a vibration pickup. With conventional instruments, such high frequency components appear in the output signal. They can sometimes be eliminated from that signal, for example by means of external electrical circuitry or by utilizing inherent limitations of response of the recording or indicating device, if one is used. In many applications, however, those techniques are not convenient or are entirely ineffective at the lowest frequencies that it is desired to eliminate. And even when that is not true, it is obviously advantageous for an instrument to present in its output signal only the frequency components that are desired.

Figure 3:
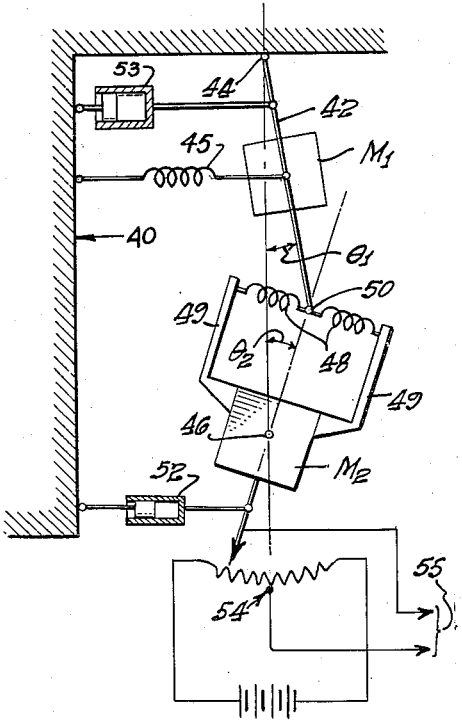
Fig. 3 is a schematic drawing representing an accelerometer illustrative of one aspect of the invention.

An illustrative accelerometer in accordance with one aspect of the invention is shown schematically in Fig. 3. It includes not only a primary dynamical system, which acts as a sensing or input system and corresponds in many respects to mass M of Fig. 1; but also a secondary dynamical system, involving a second degree of freedom. The primary and secondary systems are yieldingly coupled together in a manner to be illustratively described, and the secondary system may be considered as an indicating system from which an output signal may be derived. However, due to the coupling action, any division of the overall system into primary and secondary portions is in certain respects arbitrary. Whereas such division is useful for explanations and definition, it is not intended to be absolute.

It will be understood that the fundamental characteristics of two dynamical systems yieldingly coupled together may be embodied in many widely different types of structure, the present embodiment being merely illustrative. As shown in Fig. 3, the primary or sensing system comprises the mass $M_1$, mounted on frame 40, as by the lever 42, for relative movement along a sensitive axis, represented by the arrow 41. Resilient means, shown as the spring 45 with spring constant $K_1$, define a normal position of mass $M_1$, in the manner already explained in connection with Fig. 1. Damping means, such as 29 of Fig. 1, may also be provided, as at 53 in Fig. 3. The secondary or indicating system comprises the mass $M_2$, which is pivoted with respect to frame 40 on an axis 46, and is coupled to the sensing system by yielding means shown illustratively as the springs 48. Those springs extend from the respective arms of a yoke 49, rigidly mounted on $M_2$, to a common point 50 of lever 42, and tend to maintain point 50 in a normal position equally spaced between the two arms. That position defines a normal angular relation between the two masses $M_1$ and $M_2$. Swinging movement of $M_1$ about its pivot axis 44 tends to compress one of the springs 48 and to extend the other, thereby applying to the mass $M_2$ a torque tending to cause its rotation about its pivot axis 46 in a direction to restore normal mutual relation of the two masses. That action, however, is not positive, but is yielding in nature, the torque exerted upon $M_2$ for given angular departure of the masses from their normal relation depending upon the torque spring constant $K_2$ of springs 48. Rotation of mass $M_2$ about its pivot axis 46 is resisted by damping means, which may be of any suitable type and are indicated schematically as the cylinder and piston 52. Damping may also be provided, if desired, between mass $M_1$ and the frame, as indicated schematically at 53, or between $M_1$ and $M_2$. Such damping may be desirable, for example, to prevent excessive excursions of the primary system. However, the present aspect of the invention relates more particularly to system behavior that is primarily dependent upon damping action between the output system and the frame.

The indicating system is preferably so constructed that it is substantially insensitive to the physical quantity to be measured, except as it is affected via the primary system and coupling means. In the present illustrative instance, that may be accomplished, for example, by location of pivot axis 46 at the effective center of mass of system $M_2$. That system is then insensitive to linear accelerations in any direction.

An output signal may be derived in any suitable manner from the movement of $M_2$, the potentiometer indicated at 54 with output terminals at 55 being illustrative.

It has been discovered that a system of the type described is capable of providing many useful functions, depending in part upon selection of dynamical parameters. In particular, it has been discovered that the curves representing the overall response function of such systems which differ only in the degree of damping between $M_2$ and the frame all pass through a common or coincident point, the locus of which can be expressed in terms of the constants of the system.

It has been discovered further that a preferred type of response can be obtained by so selecting certain of the system parameters that the response function is substantially equal to unity at the coincident point. Further parameters are preferably so selected that the slope of the response function curve at the coincident point is substantially zero. The value of the damping constant is then still available for final selection to provide optimum response. The response function can thus be made substantially equal to unity throughout a frequency range that is remarkably wide, extending, for example, from zero to frequencies appreciably higher than the natural frequency of the primary or sensing system.

For clarity of illustration it will be convenient in the following discussion to consider that point 50 in Fig. 3 is equidistant from axes 44 and 46. Whereas in actual practice those distances are usually different, that difference, and also other structural differences from the present illustrative embodiment, can be taken into account by appropriate analytical methods. If the deflections of $M_1$ and $M_2$ from their respective normal positions with respect to the frame are expressed by the angles $\theta_1$ and $\theta_2$, respectively, measured as indicated in the Fig. 3, the normal mutual relation of the two systems is then such that $\theta_1 = \theta_2$. The torque exerted by spring 46 may be written $K_1\theta_1$; and that exerted by spring 48, $K_2(\theta_2 - \theta_1)$, the latter torque being taken positive when it tends to decrease $\theta_1$ and to increase $\theta_2$. Writing $I_1$ and $I_2$ for the respective moments of inertia of $M_1$ and $M_2$ and their associated structure, and writing $c_2$ for the damping constant between $M_2$ and the frame, the differential equations governing the motion of the two systems when the frame is subjected to sinusoidal accelerations along the sensitive axis in accordance with Equation 1 may be written:

$$I_1\frac{d^2\theta_1}{dt^2} + K_1\theta_1 - K_2(\theta_2 - \theta_1) = I_1\frac{a_m}{r}\cos 2\pi ft$$

$$I_2\frac{d^2\theta_2}{dt^2} + K_2(\theta_2 - \theta_1) = -c_2\frac{d\theta_2}{dt} \tag{2}$$

In the first of Equations 2, the torque produced on the primary system by the acceleration $a_m$ is written $$I_1\frac{a_m}{r}$$

where $r$ has the units of length. If $M_1$ is considered a point mass, for example, $r$ is its distance from axis 44, measured normal to sensitive axis 41.

Equations 2 may be solved in the usual manner by assuming a solution in the form $$\theta_1 = A \cos 2\pi ft + B \sin 2\pi ft$$
$$\theta_2 = D \cos 2\pi ft + E \sin 2\pi ft \tag{3}$$

and valuating the constants A, B, D and E. The response function $L_2$ is defined as the deflection amplitude $\theta_{2m}$ divided by the steady state deflection $\theta_{2s}$ that would result from uniform acceleration $a_m$, so that $$L_2 = \frac{\theta_{2m}}{\theta_{2s}} = \frac{(D^2 + E^2)^{1/2}}{\frac{a_m}{r}\frac{I_1}{K_1}} \tag{4}$$

Writing R for the ratio $f_{n2}/f_{n1}$ of the natural frequencies of the secondary and primary systems; and Q for the ratio $K_2/K_1$ of the torque spring constants for the two systems, the response function $L_2$ is given by the following equation, $$L_2^2 = \frac{R^4}{[(R^2 - F^2)(1 - F^2 + Q) - QR^2]^2 + 4u_2^2 R^2 F^2(1 - F^2 + Q)^2} \tag{5}$$

where F is the relative impressed frequency $f/f_{n1}$ and $u_2$ is the damping constant expressed as a fraction of critical damping, $u_2 = c_2/(K_2 I_2)^{1/2}$. The nature of the system response thus may be determined by appropriate selection of the physical parameters of the system R, Q and $u_2$.

Fig. 4 is a graph, similar to Fig. 2, showing typical values of $L_2$ for systems in which $R = 1$ and $Q = 2$, the two solid curves IV and V corresponding to the particular values 0 and 0.5 of the damping constant $u_2$, as indicated. An important characteristic of systems of the present type is that the curves for different values of damping constant $u_2$ all pass through a common coincident point, marked P in the graph. Furthermore, the curves all have a common slope at that point. If the system parameter Q is varied, the coincident point P moves along a definite locus. That locus, which is indicated in Fig. 4 by the dashed line VI, is given by the equation $$L_2(F^2-1)=1 \qquad (6)$$

The position of point P on that locus may be found from the parametric form of Equation 6:

$$L=1/Q \qquad (6a)$$
$$F=(1+Q)^{1/2}$$

Variation of the system parameter R causes variation of the common slope S of the response function curves at point P, but does affect the position of that point. The slope S is given by $$S=\left(\frac{dL_2}{dF}\right)_P = \frac{2}{R^2Q^2}(1+Q)^{1/2}(1+Q-R^2) \qquad (7)$$

Thus, the slope S may be made equal to zero, for example, by satisfying the relation $$R=(1+Q)^{1/2} \qquad (8)$$

In accordance with one aspect of the invention, particularly useful system behavior may be obtained by selection of system parameters such that the coincident point P lies approximately on the line $L_2=1$. That may be accomplished in a system of the type described by making the ratio Q of force constants substantially equal to unity, as may be seen from the first of Equations 6a. It is further preferred to select the system parameters so that the response function $L_2$ has an approximately stationary value (slope equal to zero) at the coincident point P. That may be accomplished by any set of values of R and Q which substantially satisfies Equation 8. If the value of Q has been selected as already described, that condition may be met by selecting R substantially equal to $\sqrt{2}$.

Fig. 5 is a graph showing illustrative values of $L_2$ for systems of the type described having $$Q=1 \qquad (9)$$
$$R=\sqrt{2}$$

The curves VII, VIII and IX correspond to the three values of damping for which $u$ equals 0, 0.5 and 0.65, respectively. The curve for $u=0.65$ indicates particularly satisfactory response behavior, for which the response function $L_2$ is substantially equal to unity for impressed frequencies from zero to the value indicated at D, which is more than 150% of the natural frequency $f_{n1}$ of the sensing system. In the conventional type of system with optimum damping, the response is flat only to about 70% of the natural frequency (Fig. 2). Not only is the useful frequency range of the instrument thus greatly extended, but the behavoir at cut-off is improved to a remarkable extent. To facilitate further comparison, curve III of Fig. 2 and curve IX of Fig. 5 are plotted together in Fig. 6.

If a significant output is taken, as before, to be more than 20% of zero frequency output, the cut-off range for curve IX is between frequencies D and E, which is only about 40% of the useful frequency range 0–D. In the conventional type of instrument, represented by curve III, the cut-off range BC is approximately 200% of the useful range 0–B. The marked improvement in sharpness of cut-off is obvious.

Fig. 6 also shows clearly that at frequencies higher than the presently defined cut-off range the asymptotic approach of the response function to zero is far more rapid for curve IX than for curve III. The high frequency performance of a system of the present type when subjected to vibrations producing constant maximum accelerations is given directly by Equation 5. For F much greater than unity, that equation reduces approximately to $$L_2=R^2/F^4 \qquad (10)$$

showing that the response function decays essentially as the fourth power of the frequency, whereas in a conventional system the decay is only with the square of the frequency. Hence, even when a system of the present type is subjected to vibrations at constant amplitude (instead of at constant maximum acceleration), for which the maximum impressed acceleration increases as the square of the frequency, the overall effective response goes rapidly to zero. Although the sensing system $M_1$ behaves as a seismic system at high frequencies, as already explained in connection with Fig. 1, the indicating system $M_2$ results in a filtering out of high frequency vibrations.

Moreover, that filtering action at frequencies considerably higher than $f_{n1}$ does not depend at all critically upon the parameters of the system. So long as the ratio R of the natural frequency of the indicating system to that of the sensing system is not much greater than unity, effective high frequency filtering action results. Hence, that action is obtainable, and may be highly useful, whether or not the parameters are so selected as to provide the wide useful response range already discussed.

The preceding discussion has been based for clarity of explanation upon a structure in which point 50 of Fig. 3 is equidistant from axes 44 and 46. However, it is often convenient in actual structure to depart from that simplifying condition. In such a structure, if D is the ratio $d_2/d_1$ of the radii of point 50 from the secondary and primary axes 46 and 44, respectively, and if constants of the actual system are denoted by primes, it can be shown that the equations of motion of the actual system can be reduced to the form of Equations 2 by the substitutions:

$$\theta_2=\theta_2'D \qquad I_2=I_2'/D^2$$
$$K_2=K_2'/D^2 \qquad c_2=c_2'/D^2 \qquad (11)$$

Equations 11 may be considered to define a fictitious system, denoted by unprimed quantities throughout, which is equivalent to the actual system and to which the preceding discussion applies directly.

In designing an actual accelerometer system to provide desired performance and to meet desired conditions of weight, space and the like, it is convenient to determine $I_1$ and $K_1$ to provide a ratio suitable to the required range of acceleration and the permissible or desirable maximum deflection $\theta_1$ of the primary element $M_1$. Then $I_2$ and $K_2$ of the "equivalent" system may be determined in at least approximate accordance with relations 9. The actual system may then be designed with any convenient value of D, and with $I_2'$ and $K_2'$ selected in approximate accordance with Equations 11. Appropriate damping means may then be designed to obtain a substantially flat response curve. Expressed in terms of a fraction of critical damping, the damping constants $u$ and $u'$ for the equivalent and actual systems have the same value. Ratios R' and Q' may be defined for the actual system, corresponding to R and Q, already discussed. It will be noted, however, that the natural frequencies of vibration of both sensing and output systems for the actual system are the same for the equivalent system. Thus, for the actual system, Equations 9 for the preferred relations described above may be written $$R'=R=\sqrt{2}$$
$$Q'=QD^2=D^2 \qquad (9a)$$

An actual system may depart in many different respects from the illustrative system of Fig. 3. For example, one or both of the systems may involve primarily elements that are movable in translation, rather than in rotation. The linkage between the two systems, involving two levers and a spring, may be considered illustrative of many different types of resilient linkage between two elements. The mass $M_1$, which is responsive to linear acceleration, and acts to produce a thrust of the nature of a torque about the axis of the primary system, is illustrative of many known types of sensing structure that are capable of producing some form of thrust upon a movable element in response to variations of some definite physical quantity. Analysis of the dynamical behavior of any specific structure can be modified to take account of differences between that structure and the present illustrative one. The described manner of taking account of the special structural characteristic, D different from unity, may be considered illustrative of the types of treatment that are available.

A further aspect of the invention provides filtering action that renders the instrument substantially non-responsive to frequencies above a cut-off value which may be appreciably lower than the natural frequency $f_{n1}$ of the sensing system. That may be of great value when a relatively low cut-off frequency is required but it is inconvenient or impractical to design a sensing system having a natural frequency in that low range. For example, if the value of $$f_{n1} = \frac{1}{2\pi}(K_1/I_1)^{1/2}$$

were reduced by reducing $K_1$, the resulting deflections of the mass $M_1$ might become excessive; while if $I_1$ were increased, the mass or size of the instrument might become excessive.

In accordance with the present aspect of the invention, a relatively low cut-off frequency may be provided without the need of departing from the value of $f_{n1}$ that is optimum for other reasons. That may be accomplished by providing a secondary or indicating system, which may be of the illustrative structural type already described, and by so selecting the constants of the indicating system that its natural frequency $f_{n2}$ is approximately equal to the desired cut-off frequency which may be considerably less than the natural frequency $f_{n1}$ of the sensing system. That may be accomplished, for example, by such selection of the moments of inertia $I_1$ and $I_2$ of the primary and secondary systems that $I_2 >> I_1$; or by selection of the torque spring constants $K_1$ and $K_2$ such that $Q = K_2/K_1 << 1$; or both of those relations may hold. It is desirable in systems of the present type to provide damping of any suitable type between the frame and the movable elements of both the primary and secondary systems. The smaller the ratio $R = f_{n2}/f_{n1}$, the greater is the tendency for the effective cut-off frequency to be determined by the indicating system and to be independent of the dynamical constants of the sensing system. For example, that tendency is significant and useful at values of R less than about ½, and is pronounced when R is less than about ⅕.

A further advantages of determining the effective cut-off frequency in the described manner, primarily as a function of the indicating system rather than as a function of the sensing system, is that in some types of instrument the natural frequency of the sensing system is subject to wide variation which ordinarily produces a corresponding variation in the effective frequency response of the instrument. However, when that frequency response is substantially independent of the sensing system, as in accordance with the present aspect of the invention, it tends to be unaffected by such variations and remains substantially constant.

Figure 7:
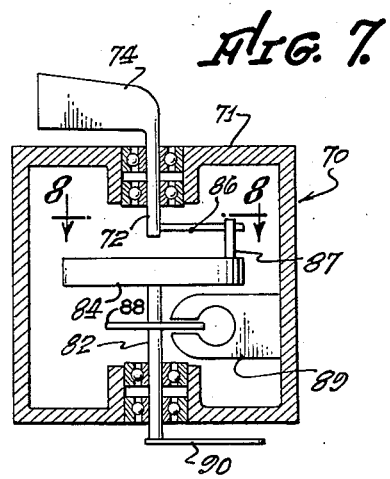
Fig. 7 is a schematic axial section representing an illustrative instrument in accordance with another aspect of the invention.
Figure 8:
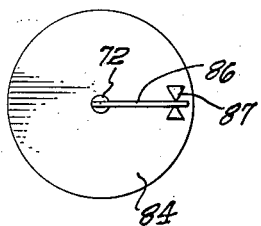
Fig. 8 is a section on line 8—8 of Fig. 7.

For example, in an instrument responsive to the direction of an airstream, as illustrated schematically in Figs. 7 and 8, the natural frequency of the sensing system depends upon the speed of the airstream. The sensing system, as shown, comprises the input shaft 72, which is journaled on the frame 70, and the vane 74, which is fixed on shaft 72 and responsive to air flowing parallel to the frame face 71. The force of the airstream upon vane 74 produces a torque tending to align the vane with the airstream. The action of that force is resilient in nature, the corresponding "spring constant" $K_1$ varying with the velocity of the airstream and the density of the air. The natural frequency $$f_{n1} = \frac{1}{2\pi}(K_1/I_1)^{1/2}$$

of the input system is subject to corresponding variations. Thus, if such an instrument is used as an angle of attack indicator in an aircraft, for example, the natural frequency at maximum speed at low altitude and at minimum speed at high altitude may differ by a factor of ten or more.

In accordance with the invention, an indicating system is provided, typically comprising the shaft 82, journaled on frame 70 coaxially with input shaft 72, a cylindrical mass 84 carried by shaft 82 and providing a suitable moment of inertia, and resilient coupling means between the two shafts. The coupling means may, for example, comprise a leaf spring 86 having one end fixedly mounted in a slot at the inner end of input shaft 72 and having its other end received between two posts 87, fixed in mass 84 near its periphery. Spring 86 defines a normal angular relation between the two shafts, but flexure of the spring permits departures from that relation. Damping means for the output system are illustrated as the conductive disk 88, fixed on shaft 82, and the magnet 89, fixed on frame 70.

If, for example, spring 86 is relatively flexible, so that $K_2$ is small, and if the moment of inertia $I_2$ of mass 84 and the structure that moves with it is large, the natural frequency $$f_{n2} = \frac{1}{2\pi}(K_2/I_2)^{1/2}$$

may be made relatively small compared to $f_{n1}$. In such a system, the output signal, illustratively shown as the movable pointer 90, is typically effectively responsive only to changes of airstream direction that correspond to frequency components lower than some cut-off value which is determined primarily by the constants of the indicating system, and is typically of the same order of magnitude as the natural frequency $f_{n2}$ of that system. Higher frequency components are filtered out by the mechanism and do not appear in the output to a significant extent. The sharpness of cut-off of that filtering action corresponds generally to that of a conventional system, as represented by curve III, but occurs at a frequency that may be far lower than the natural frequency $f_{n1}$ of the sensing system. Thus a typical graph of the response function is represented by curve X of Fig. 6, which is similar to curve III, but with the F axis compressed by the illustrative factor of about eight. A sharp peak tends to appear at approximately $F = 1$, due to resonance of the sensing system. However, that peak may be kept to negligible proportions by suitable damping of the sensing system. At higher frequencies the response function decays approximately with the fourth power of the frequency, a behavior the advantages of which have already been discussed.

A further aspect of the invention is particularly useful in instruments in which the sensing system is inherently difficult to damp satisfactorily. In a rate gyroscope, for example, the effective moment of inertia of the gyroscope assembly with respect to the frame may be relatively large, so that the restoring moment $K_1$ must also be large, for example to provide a suitable value for the natural frequency $f_{n1}$ and to hold displacements of the sensing system within reasonable values. For both reasons, provision of substantially critical damping in the conventional manner requires relatively cumbersome and expensive mechanism. In accordance with the invention, an indicating system is provided, having relatively small moment of inertia or using a relatively soft resilient coupling between the two systems, or both. Relatively simple damping of that secondary system is then capable of providing substantially critical damping, for example 0.65 of critical damping, since for critical damping the damping constant $c_2$ is proportional to $(K_2 I_2)^{1/2}$. The response function, being determined primarily by the secondary system, may then be made fully satisfactory with only nominal damping of the primary system. For example, the damping of the primary system might typically provide only about 0.2 of critical damping. Moreover, the cut-off characteristic, being determined primarily by $$f_{n2} = \frac{1}{2\pi}(K_2/I_2)^{1/2}$$

may be controlled within reasonable limits independently of the damping.

I claim:

1. In an instrument for indicating variations in a physical quantity, a frame, an input element mounted for movement relative to the frame, sensing means responsive to variations in the physical quantity and tending to move the input element in accordance therewith, the input element and the sensing means comprising a first dynamical system having a first predetermined natural frequency of vibration, an output element mounted for movement relative to the frame, resilient coupling means acting between the input and output elements and exerting on each element a force tending to move it into a predetermined normal relation with respect to the other, the output element and the coupling means forming a second dynamical system having a second predetermined natural frequency of vibration, said second natural frequency being less than about one fifth of the first, damping means acting between the output element and the frame, and indicating means responsive to movement of the output element.

2. In an instrument for selectively indicating those frequency components of a variable physical quantity that correspond to frequencies less than a predetermined critical frequency, said instrument being substantially non-responsive to those frequency components that correspond to frequencies appreciably greater than said critical frequency, a frame, an input element rotatably mounted on the frame and having an effective moment of inertia $I_1$, sensing means responsive to variations in the physical quantity and exerting upon the input element a yielding torque that has an effective torque spring constant $K_1$ and that tends to move the element to a rotary position representing the physical quantity, the value of $$\left(\frac{1}{2\pi}\right)(K_1/I_1)^{1/2}$$

exceeding said critical frequency by a factor of more than about five, an output element rotatably mounted on the frame and having an effective moment of inertia $I_2$, resilient coupling means acting between the input element and the output element and exerting upon the output element a yielding torque that has an effective torque spring constant $K_2$ and that tends to move the output element into a normal rotational relation with respect to the input element, the value of $$\left(\frac{1}{2\pi}\right)(K_2/I_2)^{1/2}$$

being less than about one fifth of $$\left(\frac{1}{2\pi}\right)(K_1/I_1)^{1/2}$$

and being approximately equal to said critical frequency.

3. In an instrument for indicating variations in the direction of an airstream of widely varying velocity, a frame, input means rotatably mounted on the frame and including a vane exposed to the airstream, said input means having a natural frequency of rotational vibration which varies widely with the velocity of the airstream and which has a predetermined average value, output means responsive to those variations of airstream direction for which the frequency is appreciably less than a predetermined critical value, and substantially independent of frequencies appreciably greater than that critical value, said critical value being substantially constant and independent of the said variations in the natural frequency of the input means, said output means comprising an output element rotatably mounted on the frame and having an effective moment of inertia $I$, resilient coupling means acting between the input means and the output element and exerting upon the output element a yielding torque that has an effective torque spring constant $K$ and that tends to move the output element into a normal rotational relation with respect to the vane, the value of $$\left(\frac{1}{2\pi}\right)(K/I)^{1/2}$$

being less than about one fifth of said average natural frequency of the input means, and indicating means responsive to movement of the output element.

4. In an instrument for indicating variations of a physical quantity, said instrument being effectively substantially critically damped, a frame, an input element rotatably mounted on the frame and having an effective moment of inertia $I_1$, sensing means responsive to variations in the physical quantity and exerting upon the input element a yielding torque that has an effective torque spring constant $K_1$ and that tends to move the element to a rotary position representing the physical quantity, first damping means acting between the input element and the frame, said first damping means having a damping constant that is small compared to $(K_1 I_1)^{1/2}$ and that provides only about one fifth of critical damping of the input element, an output element rotatably mounted on the frame and having an effective moment of inertia $I_2$, resilient coupling means acting between the input element and the output element and exerting upon the output element a yielding torque that has an effective torque spring constant $K_2$ and that tends to move the output element into a normal rotational relation with respect to the input element, second damping means acting between the output element and the frame, the quantity $(K_2 I_2)^{1/2}$ being less than about one fifth of $(K_1 I_1)^{1/2}$, and the second damping means providing substantially critical damping of the output element.

References Cited in the file of this patent

Engineering, April 11 and 18, 1952, pp. 473–5, 506–7 264—IMB.